M. C. CLARK.
Sheep Rack.
No. 58,065. Patented Sept. 18, 1866.
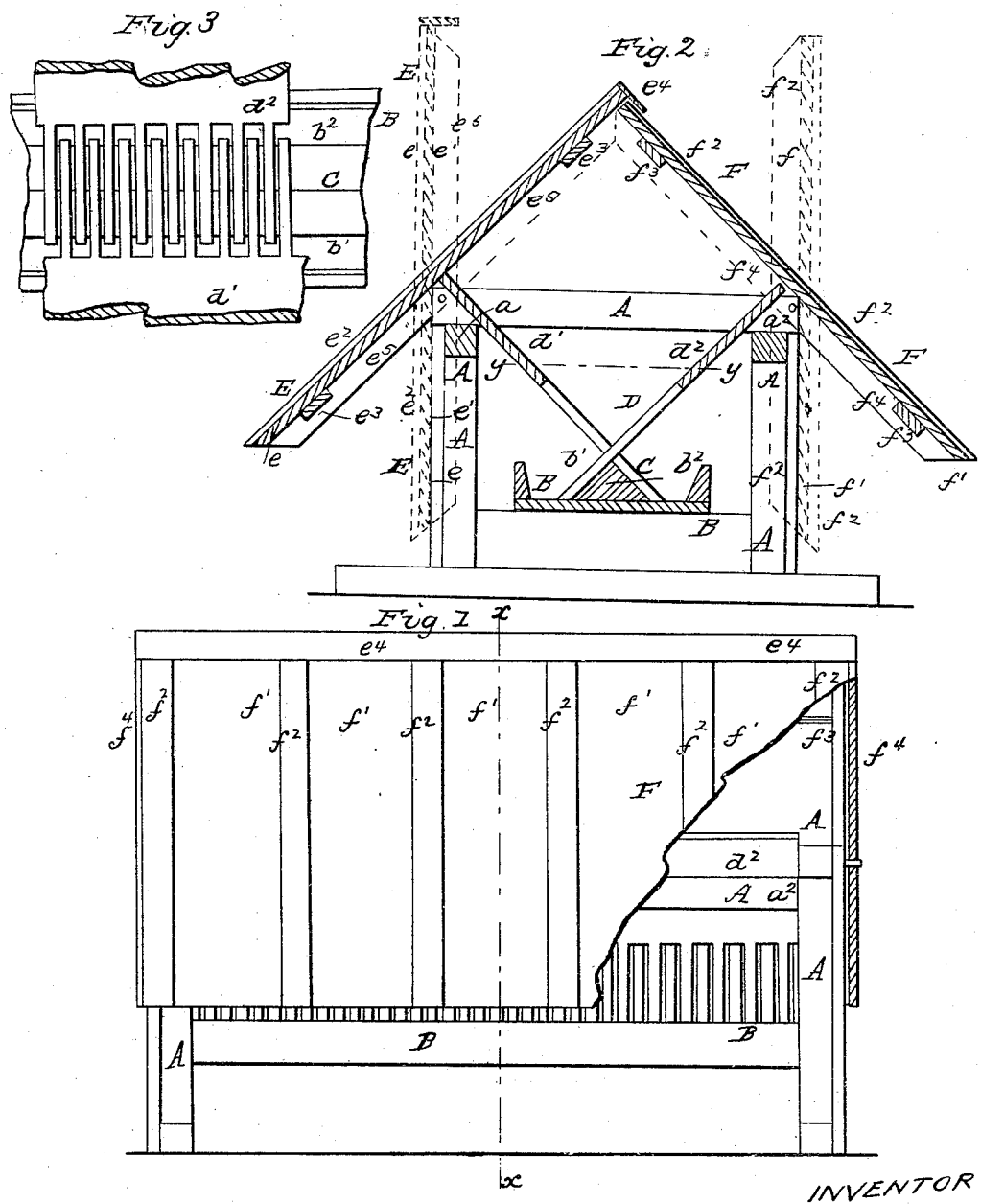

UNITED STATES PATENT OFFICE.

M. C. CLARK, OF APPLETON, WISCONSIN.

IMPROVEMENT IN SHEEP-RACKS.

Specification forming part of Letters Patent No. 58,065, dated September 18, 1866.

*To all whom it may concern:*

Be it known that I, M. C. CLARK, of Appleton, Outagamie county and State of Wisconsin, have invented a new and useful Improvement in Sheep-Racks; and I do hereby declare that the following is a full, clear, and exact description thereof, which will enable others skilled in the art to make and use the same, reference being had to the accompanying drawings, forming part of this specification, in which—

Figure 1 is a side view of my improved rack, part of the cover being broken away to show the construction. Fig. 2 is a vertical cross-section of the same, taken through the line $x$ $x$, Fig. 1. Fig. 3 is a detail sectional view of the same, taken through the line $y$ $y$, Fig. 2.

Similar letters of reference indicate like parts.

My invention has for its object to furnish an improved sheep-rack, so constructed and arranged as to prevent the dust and seeds from falling from the fodder upon the sheep, and which will protect the sheep from the weather, and especially from rain and snow storms; and it consists in the combination of the troughs, feed-receptacle, and covers with each other and with the frame of the rack, when said parts are constructed and arranged as hereinafter more fully described.

A is the frame of the machine. B is the trough, which is attached to the frame A in such a position that it may be about a foot from the ground.

C is a triangular strip of timber passing longitudinally through the center of the trough B, dividing it into two parallel troughs, $b'$ and $b^2$, as shown in Fig. 2.

D is the feed-receptacle, the side boards, $d'$ and $d^2$, of which have their lower ends resting upon the bottom of the trough B, and their upper ends are supported by resting upon the side timbers, $a'$ and $a^2$, of the frame A, as shown in the drawings.

The edges of the boards $d'$ $d^2$ are matched so as to form close joints, through which the seed and dust from the fodder may be unable to pass. The lower parts of the said boards $d'$ $d^2$ are slotted, as shown, so as to form a rack, the slats of which cross each other at the upper angle of the triangular strip C, as shown in Figs. 2 and 3.

E and F are the covers, which are formed of boards $e'$ and $f'$, laid edge to edge, and the joints of which are covered and protected by battens $e^2$ and $f^2$, as shown in Fig. 1. These boards are attached near their upper and lower edges to strips $e^3$ and $f^3$, which extend the entire length of the rack.

To the upper edge of the cover E, which overlaps the other, is attached a ridge-board, $e^4$, to protect the joint at the ridge of the roof, as shown in Figs. 1 and 2.

To the end edges of the covers E and F are securely attached narrow downwardly-projecting boards $e^5$ and $f^4$, by means of which the said covers are pivoted to the frame of the rack by pins passing through said boards $e^5$ and $f^4$ and into the timber of the frame A, as shown in Figs. 1 and 2, so that the covers E and F may be turned into vertical position, as shown in red in Fig. 2, for convenience in filling the rack with fodder.

I claim as new and desire to secure by Letters Patent—

The combination of the trough B, feed-receptacle D, and covers E and F with each other and with the frame A of the rack, when said parts are constructed and arranged substantially as herein described and shown, and for the purposes set forth.

MELVIN C. CLARK.

Witnesses:
JAS. M. BARKER,
S. C. PHINEY.